Feb. 29, 1944.     F. STIANO     2,342,766
GOGGLE
Filed Nov. 3, 1942
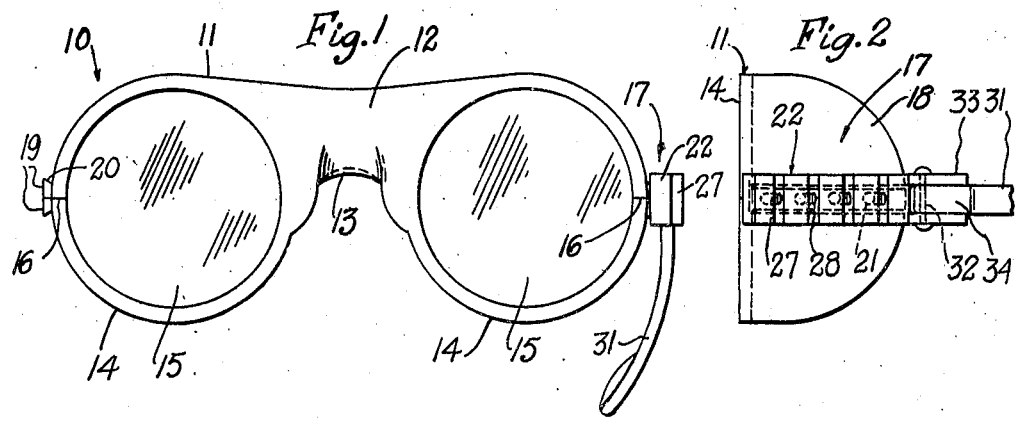
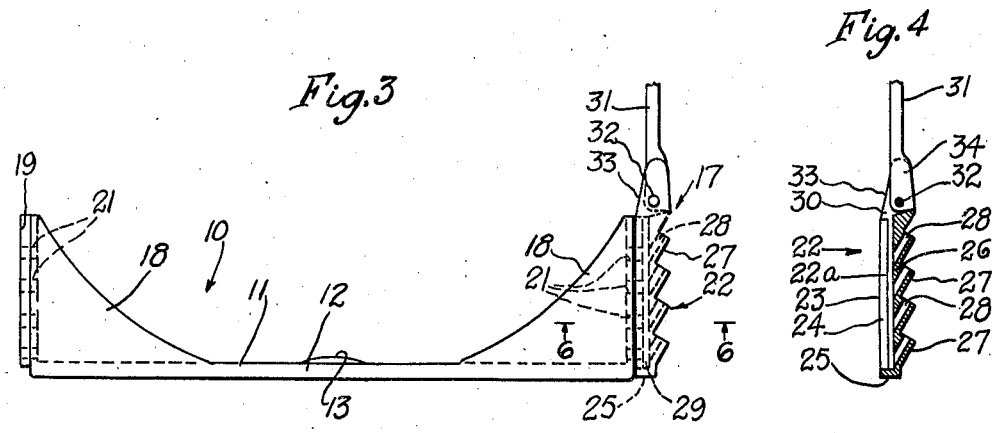
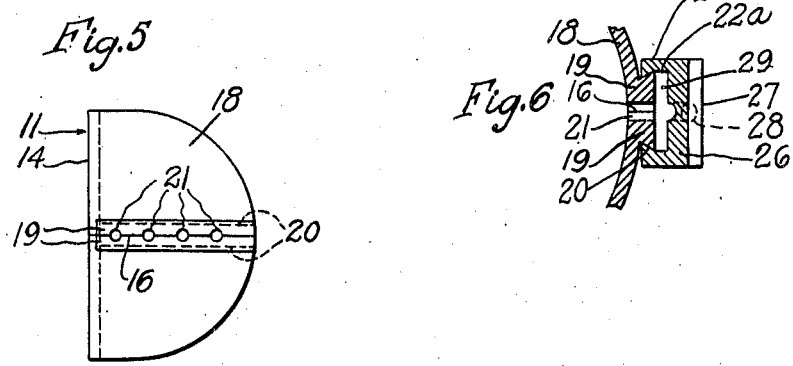
INVENTOR.
Frank Stiano
BY
Louis Schumacher, Atty.

Patented Feb. 29, 1944

2,342,766

UNITED STATES PATENT OFFICE 2,342,766

GOGGLE

Frank Stiano, Carlstadt, N. J., assignor to Columbia Protektosite Co., Inc., Carlstadt, N. J., a corporation of New Jersey Application November 3, 1942, Serial No. 464,407

4 Claims. (Cl. 2—14)

This invention relates to safety goggles such as those used to protect the eyes in welding or chipping operations, and to spectacles and ophthalmic mountings, and similar devices.

One object of the invention is to provide a device of the character described having improved means for releasably locking a member in lens holding position for easy replacement of the lens.

Another object of the invention is the provision of improved means for the easy removal of a temple for replacement or in order to facilitate the handling of a frame in replacing a lens.

Another object of the invention is to furnish a device of the nature set forth having improved means for the combined function of releasably locking the frame on a lens and detachably operatively mounting a temple.

Another object of the invention is to construct a device of the type mentioned having improved means for reenforcingly mounting a temple on an eye cup.

Another object of the invention is to afford a device having improved ventilating means for an eye cup, whereby cleaning of the ventilating openings is facilitated; whereby the eye cup is powerfully reenforced at the area otherwise weakened by the ventilating openings; whereby the direction of flow of free air relative to the ventilating openings is controlled; whereby an entrapment chamber for particles is associated with the ventilation; whereby a split frame is releasably locked on its lens by at least a portion of the ventilating means; whereby the ventilating means includes a removable part for disassembling the same or permitting opening of the lens holding frame, to which removable part the temple is operatively connected for removal as a unit therewith.

Another object of the invention is to furnish a device having means as may be necessary to realize any one or more of the objects or advantages previously noted, in various possible combinations.

Another object is to construct a device for opening a split lens frame or a ventilating unit for a lens cup or for both purposes, in improved association with a temple so that the latter acts to prevent opening movement of the device when the temple is engaged on the ear, but permits free and direct opening movement when the temple is disengaged from the ear.

A further object of the invention is to provide a device that is simple, rugged, durable, and adapted for manufacture by molding, casting or stamping, from metals, plastics, or composition materials, on a quantity production basis, and which is light, neat and compact.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in front elevation showing a device embodying the invention, with a part removed.

Fig. 2 is a fragmentary view in end elevation thereof.

Fig. 3 is a fragmentary top plan view with a part removed.

Fig. 4 is a fragmentary longitudinal horizontal sectional view of the removed part.

Fig. 5 is an end view of device, with said part removed.

Fig. 6 is a fragmentary enlarged sectional view taken approximately on line 6—6 of Fig. 3.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device embodying the invention, exemplified by way of illustration in a goggle that is used for welding or chipping. In such a goggle breakage or marring of the lenses is of frequent occurrence, and hence the goggle must be adapted for quick and easy replacement of the lenses. Because such goggles generally receive rather rough handling, it is desirable that the temples shall be removed when the lenses are being replaced, and that the eye shields or cups shall be reenforced, whereby breakage and distortion shall be avoided. Ventilation in such goggles is important, and preferably flying particles should be deflected as by louvres or caught in a chamber associated with the ventilating means. Preferably the attachment means for the temples are associated with the reenforcement means and the latter with the ventilating means in an improved, rugged and compact structure, which has the further advantage of permitting the ventilating means to be opened for cleaning in the operation of detaching the temples and opening the frame for lens replacement. Thus a mutually reenforcing arrangement of parts is achieved, which are in direct functional relation to each other and cooperate to afford a knockdown structure for disassembling all sections of the device.

The goggle 10 may comprise a frame 11 having a broad, protective bridge 12, slightly rearwardly offset at 13 for seating on the nose, to prevent contact of the lens with the eyelashes. The frame 11 may include a plurality of frame portions 14 adapted to suitably seat the lenses 15 in the usual manner. For lens replacement, each frame portion 14 may be split as at 16 so as to be expansible for removal and insertion of lenses into seating engagement. To lock each frame portion 14 on its lens 15, devices 17 are employed as hereinafter described.

Certain advantages of the invention are especially well exemplified by the use of the devices 17 with eye shields 18. The latter may be rigidly connected to the frame portions 14 so as to furnish eye cups therewith, the split 16 being elongated continuously into or through the shields 18, to the extent desired (see Fig. 5). Hence when a frame portion 14 is expanded, the shield 18 is correspondingly opened up along the split line 16. The eye shield is weakened by the split and is easily subject to breakage when opened up. To reenforce the eye shield, particularly the marginal portions thereof along the split 16, reenforcement means such as ridges 19 are provided on opposite sides of the split. It is of advantage that these ridges 19 shall cooperate with each other to form a rail or track which may be longitudinally undercut at its opposite edges at 20 as clearly shown in Fig. 6. This track may extend to the rear edge of the eye shield 18 to protect the corners thereof at the split, but may terminate short of the front face of the goggle. Formed adjacent to or directly in the line of the split 16 are the ventilating openings 21, one or more of which may be provided, of any desired size or shape, in the nature of slots or circles. It will now be apparent that upon opening or expanding the frame portion 14, the lens 15 may be replaced, or the openings 21 may be cleaned, as desired. It will be further perceived that the openings 21 lie in the reenforcement area to thus avoid weakening the generally thin wall of the eye shield; thus the reenforcement of the expansible track 19, 19 is available for the ventilating portion, regardless whether the opening be a part of the split or spaced therefrom.

The usual practise in the ventilation of eye cups is to provide openings for the entrance and exit of the air to thus promote circulation and assure that the glass shall not become clouded. I have found that this requisite is easily solved by the provision of a ventilating area elongated substantially from the front to the back of the eye shield. For this purpose a series of openings 21 may be provided. Other features of the ventilating means will be described hereinafter.

The device 17, embodying the invention, may also include a member 22 which is movable along the track 19, 19 for releasable interlocking with the sections of the split eyeshield 18. Preferably the member 22 is wholly removable as indicated in Fig. 4. Formed in the member 22 is a recess 22a adapted to receive the said track 19, 19, the side walls 23 of the recess being undercut or beveled at 24 to slidingly engage the undercut edges 20 of the track to thus provide a locked track means or dovetail joint, as clearly shown in Fig. 6. Thus the expansible track 19 is releasably held closed as shown in Fig. 5.

In order to prevent removal of the member 22 from the track 19, 19 except in a forward direction, an end wall 25 for the recess may integrally unite the side walls 23 and serve as a stop by abutting the front end of said track. The particular advantage of this will be apparent hereinafter when the temple mounting is described. It will be seen that this structure of the member 22 assures mutual reenforcement of its walls and neatness in appearance since the end wall 25 conceals the dovetail joint as indicated in Fig. 1. The rear end of the recess 22a may be open for reception of the track.

Formed on the side wall 26 of the member 22 are a plurality of louvre portions 27, sloping rearward and affording a ventilating means by virtue of their associated openings 28, which are arranged so as to be in approximate alignment with the openings 21, at least at their inner ends. Thus resistance to air flow is diminished and yet the effect of the louvres is to deflect a direct air current or particles flying from the work on which the user is engaged, to keep the lens clear and to avoid danger to the eyes of the wearer.

Should a fine particle enter an opening 28 it may settle by reason of the angularity between the direction of the openings 21 and 28. But this may not be sufficient in the case of very fine particles or where the velocity of the air is high. Moreover, a relatively sharp angle between the openings is difficult to provide. Hence it is preferred to arrange an entrapment chamber 29, being an enlargement or extension of the recess 22a, for retaining the particles. The settlement space thus afforded is especially effective because it lies at the angle between the openings 21 and 28. The change in direction will cause the particles to easily settle out. It will be noted that the settlement chamber is open at its rear end at 30 to afford the opportunity for expansion so that a rather low dynamic condition of the air is maintained. This facilitates entrapment of the particles and also forms an added ventilating opening especially as the openings 21 may easily be made larger than those at 28. It is now clear that the ventilating means is within the reenforced area defined by the member 22, and that when the latter is removed, all parts of the ventilating means are readily accessible for cleaning. It will be perceived that due to the space at 29, the openings 21 and 28 need not be in approximate alignment.

While the temple 31 may be variously operatively mounted, it is preferred to permanently pivotally connect the same at 32 to the member 22. Hence the member 22 may have a pair of hinge ears 33, receiving therebetween the ear 34 of the temple. The ears 33 may be formed as longitudinal reenforcements or ridges, extending beyond their pintle 32 and being in alignment with or a continuation of the walls or ridges 23. Thus the temple is held in alignment. Any suitable stop engagement may be afforded at 35 limiting the swinging movement of the temple while permitting folding thereof into collapsed position.

When the device 10 is worn the temple 31 prevents accidental forward releasing movement of the member 22, and the end wall 25 serves as a carrier for the frame 11.

If the dovetail connection be rather snug, frictionally, it may be used as an adjusting means to shorten the effective length of the temple by moving the member 22 to a position slightly forward of that shown.

Because the reenforcement means for the eye shield should lie at the greatest width thereof, and hence in central horizontal position as shown, it is structurally of distinct advantage to mount the temple on the member 22.

I claim:

1. A goggle having an eye cup split for expansibility for lens replacement, confronting ridges on the eye cup extending along the split, a recessed member elongated to receive the ridges and having dovetailed movable engagement therewith, and a plurality of ventilating openings formed in the eye cup and member along the plane of the split.

2. A goggle having an eye cup split for expansibility for lens replacement, confronting projecting portions on the eye cup along the split, a member movably engaged with the projecting portions to lock the eye cup on a lens, said eye cup and member having a ventilating opening therethrough, and a louvre externally carried by said member for deflecting particles from entering said opening.

3. A goggle having an eye cup having a hollow wall structure providing a first wall portion and a second wall portion, ventilating openings in said wall portions, the second wall portion being removable and having louvres for deflecting particles from its openings, and means for detachably connecting the second wall portion to the eye cup.

4. A goggle having an eye cup split for expansibility for lens replacement, confronting projections on the eye cup extending along the split, a member having spaced lips for removably receiving said projections in dovetailed engagement to thus lock the eye cup on a lens, said member having a pair of projecting fingers forming continuations of said lips, and a temple pivotally mounted on the member so as to be laterally supported by said fingers.

FRANK STIANO.